United States Patent [19]
Walon et al.

[11] 3,922,200
[45] Nov. 25, 1975

[54] ENZYMATIC HYDROLYSIS OF GRANULAR STARCH

[75] Inventors: Raoul Guillaume Philippe Walon, Brussels; Elie Francois Berghmans, Machelen, both of Belgium

[73] Assignee: CPC International Inc., Englewood Cliffs, N.J.

[22] Filed: Mar. 18, 1974

[21] Appl. No.: 452,154

[52] U.S. Cl. .............................. 195/31 R; 195/11
[51] Int. Cl.² .................................. C12D 13/02
[58] Field of Search ........... 195/7, 11, 31 R, 63, 68, 195/66, 65

[56] References Cited
UNITED STATES PATENTS

| | | | |
|---|---|---|---|
| 2,583,451 | 1/1952 | Wallerstein | 195/11 |
| 3,039,936 | 6/1962 | Lenny et al. | 195/11 |
| 3,280,006 | 10/1966 | Hurst et al. | 195/31 R |
| 3,720,583 | 3/1973 | Fisher | 195/31 R |

FOREIGN PATENTS OR APPLICATIONS

| | | | |
|---|---|---|---|
| 2,025,748 | 12/1970 | Germany | 195/65 |

OTHER PUBLICATIONS

Corn Starch, Corn Industries Research Foundation, Inc., 1964, pp. 28–32.

Leach et al., Cereal Chemistry, pp. 34–46, (1961).

Chem. Abstracts 74:139529a.

Twisk, Starke, Vol. 32, (1970), No. 7, pp. 228–230.

Briggs, Enzymologia, Vol. 26, No. 6, (1963), pp. 355–363.

*Primary Examiner*—A. Louis Monacell
*Assistant Examiner*—Thomas G. Wiseman
*Attorney, Agent, or Firm*—Albert P. Halluin

[57] ABSTRACT

A method for the hydrolysis of starch wherein an aqueous slurry of granular starch is first stabilized in part by the action of alpha-amylase under non-gelatinizing conditions, then heated briefly to solubilize the remaining granular starch, then saccharified by treatment with a saccharifying enzyme.

33 Claims, No Drawings

ENZYMATIC HYDROLYSIS OF GRANULAR STARCH

The invention of this application relates to the conversion of starch to a soluble hydrolysate and in particular, to such conversion which is effected wholly by enzymes.

BACKROUND OF THE INVENTION

Starch is a polymeric carbohydrate material of very high molecular weight. Its monomeric units, termed anhydroglucose units, are derived from dextrose, and the complete hydrolysis of starch yields dextrose. In the United States, dextrose is manufactured from corn starch; is Europe from corn starch and potato starch; and in Japan from corn starch and white sweet potato starch.

Until 1960, dextrose was prepared from starch by acid hydrolysis. The method of preparation involved heating starch with hydrochloric or sulfuric acid at temperatures of 120°–145°C, then neutralizing the hydrolysis mixture with sodium carbonate, clarifying and crystallizing the dextrose. Unfortunately, the yield of dextrose is lowered by the formation of relatively large amounts of reversion products, i.e., products which are formed by the recombination of dextrose molecules. Also, because of the high temperature and the low pH of the hydrolysis reaction, some of the starch is converted to hydroxymethyl furfural, levulinic acid and color bodies. The formation of such degradation products is irreversible and, to the extent they are formed, the yield of desired dextrose is of course adversely affected. Still further, the use of hydrochloric acid or in some instances, sulfuric acid, and the subsequent neutralization of this acid with alkali results in the formation of inorganic salts which interfere with crystallization of the final dextrose product.

Later, hydrolysis of starch to dextrose was accomplished by means of enzymes. The principal enzyme used for such purpose was, and continues to be, glucoamylase. This enzyme effectively hydrolyzes the starch by cleaving one molecule of dextrose at a time from the starch molecule. As a practical matter, however, it is necessary first to thin the starch before subjecting it to the action of glucoamylase. This thinning step may be accomplished either by means of acid or enzyme. The starch is thinned to a D.E. of about 10–20, then treated with glucoamylase. This two-stage process is referred to as an acid-enzyme process or an enzyme-enzyme process, depending upon the nature of the thinning step employed.

In the case of the acid-enzyme process, the initial acidthinning step also requires a rather high temperature, i.e., in the order of 120°C. This of course produces starch fragments that readily retrograde, and also produces reversion products. As expected, these occur at the expense of the desired formation of dextrose.

The same characteristic of the enzyme-enzyme process which also requires a relatively high temperature for the thinning step, viz., 85°–95°C. Furthermore, it is usual practice to heat the thinned starch at still higher temperatures, viz., of the order of 120°–160°C, to complete gelatinization of the starch and to improve filtration. In addition, certain fat amylose complexes are formed which are quite insoluble and cause filtration difficulties.

None of these processes is entirely free of processing difficulties because of the viscosity problem in the early stages of the process, and also because of the inevitable presence of retrogradation products, starch-fat complexes and reversion products. To the extent that these are formed, processing difficulties are encountered particularly in the filtration of the product mixture, and the yield of dextrose is diminished.

a. The same problems, by and large, are associated with prior art processes for the preparation of maltose or maltose-rich products by the hydrolysis of starch.

Wallerstein et al. (U.S. Pat. No. 2,583,451) disclose an enzymatic hydrolysis process which does not utilize a high temperature gelatinization step, but the yields of dextrose are quite low. Leach et al. Cereal Chemistry, Vol. 38, No. 1, January, 1961, pp. 34–46, likewise show the enzymatic hydrolysis of granular starch, with various alpha-amylases, but at low temperatures.

It is accordingly a principal object of the present invention to provide an improved process for the conversion of starch to its hydrolysis products.

It is another object of the present invention to provide a process for the solubilization of granular starch.

It is another object of the present invention to provide such a process which results in high yields of dextrose.

It is another object of the present invention to provide such a process which is characterized by the substantial absence of the above processing difficulties.

SUMMARY OF THE INVENTION

These and other objects are accomplished by a method for the hydrolysis of starch comprising the following steps in order:

a. solubilizing an aqueous slurry of granular starch by treatment with an alpha-amylase, under conditions which avoid gelatinization, to solubilize at least about 10% of the starch;

b. heating said aqueous slurry at a temperature above the gelatinization temperature of the starch so as to gelatinize substantially all of the remaining granular starch; and c. saccharifying the gelatinized product by treatment with a saccharifying enzyme.

More particularly, the method comprises the following steps in order:

a. preparing an aqueous slurry of granular starch and an alpha-amylase at a pH from about 5 to about 7; and heating said mixture at a temperature of from about 40°C to solubilize at least about 10% of the starch;

b. heating said mixture at a temperature above the gelatinization temperature of the starch so as to gelatinize substantially all of the remaining granular starch; and c. heating said mixture with a saccharifying enzyme at a temperature of from about 50°C to about 65°C and at a pH of from about 4 to about 6 and maintaining these conditions until the D.E., based on total solids of said mixture, is substantially increased.

The starch may be any of those commonly available, including corn starch, waxy maize starch, tapioca starch, potato starch, white sweet potato starch, wheat starch, sago starch, sorghum starch, high amylose starch and the like. Waxy and the non-waxy starches are suitable. As indicated, the starch is granular. Corn grits and other raw materials high in starch content may be used satisfactorily.

An important advantage of the process is that it may be carried out in an aqueous slurry at relatively high concentrations. The solids content of the starch slurry generally is within the range of from about 5% to about 40% although ordinarily the solids content will be 10-30%. Lesser concentrations can of course be used, and in general as the concentration is decreased, the ease with which the conversion mixture may be handled is increased. As a practical matter, however, it is highly desirable in most instances to use smaller volumes, i.e., higher concentrations of starch. This avoids or at least diminishes the considerable expense of concentrating the conversion mixture prior to crystallization.

The process herein permits the solubilization of all of the starch in a 25% aqueous slurry, for example, without the development of high viscosity, thus avoiding one of the significant disadvantages of prior art processes.

The bacterial alpha-amylase perferably is one which is active within the pH range of from about 5.0 to about 7.0 and which retains appreciable activity at relatively low temperatures, i.e., below the temperature at which a particular starch gelatinizes. Preferred sources of such alpha-amylases include certain species of the Bacillus microorganism, viz., *B. subtilis*, *B. licheniformis*, *B. coagulans* and *B. amyloliquefaciens*. Suitable alpha-amylases are described in Austrian Patent application No. 4836/70 and in U.S. Pat. No. 3,697,378. Especially suitable amylases are those derived from *B. licheniformis* as described in the above Austrian patent application. Particularly preferred is that alpha-amylase derived from *B. licheniformis* strain NCIB 8061; other specific microorganisms include *B. licheniformis* strains NCIB 8059, ATCC 6598, ATCC 6634, ATCC 8480, ATCC 9945A and ATCC 11945. They are unusually effective in the liquefaction of granular starch, i.e., when used in the substantial absence of glucoamylase. One such enzyme is identified by the trade name "Thermamyl", available from Novo Terapeutisk Laboratorium, Copenhagen, Denmark. For such use the alpha-amylase should be used in a concentration ranging from about 0.1 to about 25 units per gram of starch (dry basis) under conditions of pH and temperature set out earlier herein. Thermamyl is characterized by the following properties
  a. it is thermally stable;
  b. it is active throughout a wide range of pH; and
  c. its activity and heat stability are less independent than other alpha-amylases on the presence of added calcium ion.

Typical analyses of three different Thermamyl preparations are as follows:

|  | Thermamyl 60 | Thermamyl 120 | Thermamyl |
|---|---|---|---|
| Dry Substance, % | 35.4 | 98.8 | 94.6 |
| Alpha-amylase activity, U/g (as is) | 1,156 | 2,105 | 9,124 |
| Protein, % d.b. | 26.5 | 21.2 | 21.2 |
| Ash, % d.b. | 60.1 | 91.2 | 64.4 |
| Calcium, % d.b. | 0.04 | 0.72 | 4.9 |
| Sodium, % d.b. | 12.3 | 12.2 | — |

Still other suitable alpha-amylases which are available include the following:

Table I

| Enzyme Preparation | Company | Form | Activity |
|---|---|---|---|
| Rhyzyme H-39 | Rohm & Haas | Powder | 4,874 U/g |
| Takamine HT-1000 | Miles | Powder | 3,760 U/g |
| Tenase | Miles | Liquid | 2,043 U/ml |
| Dex-Lo MM | Wallerstein | Liquid | 1,213 U/ml |
| Novo SP-96 | Novo | Powder | 7,310 U/g |
| Novo B. subtilis | Novo | Liquid | 1,599 U/ml |
| Kleistase GM-16 | Daiwa Kasai | Powder | 26,593 U/g |
| Kleistase L-1 | Daiwa Kasai | Liquid | 1,918 U/ml |
| Rapidase SP-250 | Societe "Rapidase" France | Powder | 11,655 U/g |

The amount of bacterial alpha-amylase to be used ranges from about 0.1 to about 25 units per gram of starch (dry basis). The use of larger amounts provides no practical advantage; the increased starch solubilization which results from the use of more than 25 units per gram does not justify the additional cost of enzyme. The optimum quantity of alpha-amylase depends upon the quantity of saccharifying enzyme, and vice versa. A preferred range of concentration of alpha-amylase is from about 1.0 to about 10 units per gram of starch (dry basis).

The alpha-amylase activity of an enzyme is determined as follows:

The enzyme is allowed to react with a standard starch solution under controlled conditions. Enzyme activity is determined by the extent of starch hydrolysis, as reflected by a decrease in iodine-staining capacity, which is measured spectrophotometrically. The unit of bacterial alpha-amylase activity is the amount of enzyme required to hydrolyze 10 mg. of starch per minute under the conditions of the procedure. The method is applicable to bacterial alpha-amylases, including industrial preparations, except materials which possess significant saccharifying activity.

From 0.3 to 0.5 gram of solid sample or from 0.3 to 1.0 ml. of a liquid sample is dissolved in a sufficient quantity of 0.0025 M. aqueous calcium chloride to give an enzyme solution containing approximately 0.25 unit of activity per ml.

A mixture of 10 ml. of 1% Lintner starch solution, equilibrated to 60°C and 1 ml. of the enzyme sample to be tested is mixed and held in a constant temperature bath for exactly 10 minutes. A 1-ml. sample is removed and added to a mixture of 1 ml. of 1 M aqueous hydrochloric acid and about 50 ml. of distilled water. The iodine-staining capacity of such acidified sample then is determined by adding 3.0 ml. of 0.05% aqueous iodine solution, diluting to 100 ml. with distilled water, and mixing well. The absorbance of the solution, relative to that of distilled water, is measured at 620 nm, in a 2-cm. cell. A similar measurement is made of the standard starch solution (to which water is added instead of the enzyme solution) to provide a blank absorbance.

The enzyme activity, in units/gram or/ml. is equal to $$\frac{(\text{Blank Absorbance} - \text{Sample Absorbance}) \times \text{Dilution Factor} \times 50}{\text{Blank Absorbance} \times 10 \times 10}$$

The saccharifying enzyme may be glucoamylase or a maltogenic enzyme.

the glucoamylase may be any of the well-known fungal amylase preparations, particularly those derived from members of the Aspergillus genus, the Endomyces genus or the Rhizopus genus. A particularly preferred glucoamylase is that available from the process described in U.S. Pat. No. 3,042,584 (Kooi et al.) whereby a fungal amylase preparation is freed of undesired transglucoasidase activity by treatment in an aqueous medium with a clay material. The amount of glucoamylase to be used in the saccharification step ranges from about 0.05 unit to about 5.0 units per gram of starch (dry basis). Preferably, on an enzyme cost/performance basis, from about 0.05 to 0.25 units of glucoamylase per gram of starch (dry basis) is used in the saccharification step.

Glucoamylase activity units are determined as follows:

the substrate is 15–18 D.E. acid hydrolysate of corn starch dissolved in water and diluted to 4.0 grams of dry substance per 100 ml. of solution. Exactly 50 ml. of the solution is pipetted into a 100 ml. volumetric flask. To the flask is added 5.0 ml. of 1.0 molar sodium acetate-acetic acid buffer (pH: 4.3). The flask is placed in a water bath at 60°C and after 10 minutes the proper amount of enzyme preparation is added. At exactly 120 minutes after addition of the enzyme preparation the solution is adjusted to a phenolphthalein endpoint with one normal sodium hydroxide. The solution is then cooled to room temperature, and diluted to volume. A reducing sugar value, calculated as dextrose, is determined on the diluted sample and a control with no enzyme preparation added. Glucoamylase activity is calculated as follows:

$$A = \frac{S - B}{2 \times E}$$

where $A$ = glucoamylase activity units per ml. (or per gram) of enzyme preparation $S$ = reducing sugars in enzyme converted sample, grams per 100 ml. S should not exceed 1.0 gram per 100 ml.

$B$ = reducing sugars in control, grams per 100 ml.

$E$ = *amount of enzyme preparation used, ml. (or grams).*

The maltogenic enzyme, i.e., beta-amylase, may be derived from malted grains such as barley, sorghum, soybeans, sweet potatoes, or wheat. Barley malt is available from a number of commercial sources under various proprietary names, e.g., Fromalt 72 and malt amylase PF. Biozyme M, a fungal enzyme, is also useful. The amount of betaamylase to be used in the saccharification step ranges from about 0.1 unit to about 5 units per gram of starch (dry basis).

Beta-amylase activity units are determined as follows:

A 5.00-gram sample of beta-amylase material finely ground so as to pass a 20-mesh screen, is placed in a 100 ml. volumetric flask and suspended in 70–80 ml. of distilled water. This mixture is stirred for 3 hours at room temperature, diluted to exactly 100 ml. with distilled water, and filtered by gravity through a Whatman No. 12 filter paper. A 10-ml. sample of the enzyme extract (filtrate) is diluted with distilled water to 100 ml.

An approximately 8% (by weight) solution of a corn starch hydrolysate having a D.E. of 15–20 is prepared by weighing (±0.01 gram) a quantity of an aqueous solution of such starch hydrolysate so as to provide about 40.0 grams of dry material. This is transferred quantitatively to a 500-ml. volumetric flask, and diluted to volume and mixed thoroughly. A 50.0 ml. sample of such starch hydrolysate solution is pipetted into a 100-ml. volumetric flask and 5 ml. of sodium acetate buffer solution is added. The temperature of the resulting solution is raised to 50°C whereupon an aliquot portion of the above diluted enzyme extract is pipetted into the flask. A similar, blank solution, e.i., where distilled water is substituted for the diluted enzyme extract, is prepared.

After 55–57 minutes, 3 drops of phenolphthalein indicator is added to each flask. After exactly 60 minutes has elapsed, the flasks are removed from the 50°C temperature bath and immediately neutralized to the first faint pink coloration by the addition of 1% aqueous sodium hydroxide solution, plus an additional 0.5 ml. The contents of the flask are cooled to room temperature, then diluted to volume with distilled water and mixed thoroughly. The reducing sugar content of 5.0-ml. aliquots are determined using the Schoorl method. The calculation of enzyme activity, in units per gram of dry starch is made as follows:

A. Reducing sugar (R.S.) Contents:

$$\text{Total R.S., g} = \frac{(\text{mg R.S. in 5-ml. aliquot}) \times 20}{1000}$$

B. Enzyme Activity, Units/g =

$$\frac{\text{Sample R.S., g} - \text{Blank R.S., g} \times 10 \times 100}{\text{Sample Wt, g} \times \text{Aliquot Volume, ml}}$$

In a preferred embodiment the starch conversion mixture contains an anionic surfactant. In certain concentrations the surfactant enhances the degree of solubilization and yield of dextrose, i.e., in concentrations ranging from about 0.01 to about 1.0%. Best results are obtained with a concentration of anionic surfactant ranging from about 0.05 to 0.50%. Typical anionic surfactants useful herein include sodium lauryl sulfate, sodium dodecylbenzene sulfonate, sodium was-substituted napthalene sulfonate, sodium stearate, and triethanolamine alkyl sulfates where the alkyl group is derived from alcohols produced by the reduction of tallow or coconut oil glycerides. In general, the anionic dispersants herein are water-soluble salts having an alkyl group containing from about 8 to 20 carbon atoms, a sulfonic acid or sulfuric acid ester radical, and either sodium, potassium, ammonium or aliphatic amine having fewer than 10 carbon atoms, as the cation.

Step (a) above requires, as indicated, the preparation of an aqueous slurry of granular starch and an alpha-amylase. The slurry may contain only these components or it may also contain one or more saccharifying enzymes of the type discussed above. The presence of glucoamylase or beta-amylase in the slurry of step (a) increases the rate of solubilization of the granular starch and thus shortens the required duration of the step. The desirability of incorporating one or more of these saccharifying enzymes in the aqueous slurry of this stage of the process is a matter of balancing the additional cost of the enzymes against such beneficial influence. When thus used in this solubilization step, the amount of saccharifying enzyme ranges from about 0.01 to about 0.30 unit of glucoamylase per gram of starch (dry basis) or from about 0.1 unit to about 5 units of beta-amylase per gram of starch (dry basis), as the case may be.

The pH of step (a) is governed of course by the optimum pH of the particular alpha-amylase which is used. Thermamyl exhibits its optimum activity at a pH of 5–7; Rapidase exhibits its optimum activity at a pH of about 6.0; etc. In those instances, as discussed later herein, where a saccharifying enzyme is included with the alpha-amylase in step (a) the lower pH at which these saccharifying enzymes exhibit their optimum activity (and at which they are stable) requires a modification of the pH which is best employed when the alpha-amylase is used alone. Glucoamylase, for example, exhibts its optimum activity at a pH of 4.0–4.5. Beta-amylases exhibit their optimum activity at a somewhat higher pH, but still below that at which alpha-amylases are most active. It is thus necessary to select a pH at which the alpha-amylase when used alone is most active, or at the pH at which the several enzymes, when used in combination, exert their overall optimum activity.

The temperature of the reaction mixture of step (a) should, as indicated, be from about 40°C up to the actual gelatinization temperature of the starch. Ordinarily, the temperature will be within the range of from about 55°C to about 75°C. A particular advantage of the process is the fact that prolonged high temperatures are avoided. This permits a considerable savings in the cost of supplying heat to the process and lessens the formation of color bodies with a subsequent savings in refining costs. At the same time, however, it is interesting to note that this step can be carried out at temperatures above the normal gelatinization temperature of a starch without noticable gelatinization as evidenced by an increase in viscosity. Despite tha fact that corn starch for example, is considered to have a gelatinization range of 62°–72°C, i.e., its "normal" gelatinization temperature, step (a) of the present invention may be carried out with corn starch at temperatures up to about 80°C without any noticeable increase in viscosity. As a matter of fact, it usually is desirable to carry out the step at these higher temperatures, because of the increased rate and extent of solubilization of starch.

When the above step is conducted at temperatures exceeding the initial gelatinization temperatures of the starch, it is desirable to have hydrolysis products present during the reaction. One way of accomplishing this is to add the enzyme(s) to the starch at a temperature equal to or lower than the initial gelatinization temperature, and then to heat the mixture to the desired temperature.

Following step (a) wherein the aqueous slurry is solubilized at a temperature which avoids gelatinization, the mixture is then heated at a temperature above the gelatinization temperature, so as to gelatinize completely the remaining starch. At this point, having solubilized at least about 10% of the granular starch, gelatinization of the remaining starch does not increase the viscosity of the mixture to such a point as to require special mixing equipment. Thus, the disagreeable "viscosity peak" ordinarily encountered in the gelatinization of starch is avoided. The duration of this gelatinization step is brief, ordinarily being completed in 8 or 10 minutes. In some instances, depending upon the extent of solubilization in step (a), this gelatinization step may require a somewhat longer period of time, e.g., up to about 60 minutes.

The temperature at which this gelatinization step is carried out may range from about 85°C to about 150°C, but ordinarily is from about 100°C to about 115°C.

Following the gelatinization step, the temperature is lowered to from about 50°C to about 65°C and this temperature maintained for a period of time ranging from about 40 to about 120 hours. Also, the pH is adjusted so as to provide optimum saccharification conditions. If glucoamylase is the saccharifying enzyme, then the pH is lowered to within the range of from about 4.0 to about 4.5. If beta-amylase is the saccharifying enzyme, then the pH is adjusted to within the range of from about 4.0–6.0. In some instances the pH of steps (a) and (c) may desirably be the same.

Optionally, especially where the saccharifying enzyme is glucoamylase, after the temperature of the gelatinized mixture is lowered but before the pH thereof is adjusted, the mixture may be maintained at the higher pH of step (a) for 1–6 hours. In some instances, this is effective to shorten the overall period of time required to product maximum dextrose.

A preferred embodiment of the invention involves the method of ultrafiltration in step (c). By selection of a suitable semipermeable membrane, the enzyme and dissolved starch hydrolysate may be completely retained by the membrane while the dextrose or maltose product, being of lower molecular weight, passes through as it is formed. Ultrafiltration is discussed in "New Separation Technique for the CPI", Chemical Engineering News, 64, No. 12 (1968).

In some instances it is desirable to incorporate an isoamylase enzyme such as pullulanase into either or both the solubilization step (a) and the saccharification step (c). The amount of isoamylase may range from about 0.10 unit to about 0.5 units per gram of starch. The use of pullulanase, for example, is effective to increase solubilization and to facilitate filtration of the final hydrolysate.

The starch hydrolysis product may be worked up in the usual manner, i.e., by concentration and crystallization.

The method of the invention is illustrated by the following examples which, however, are not limiting in any respect.

EXAMPLE 1

A starch slurry containing 32% of granular corn starch, 2.4 units of Thermamyl per gram of starch and 0.07 unit of glucoamylase per gram of starch is heated to 60°C and the pH adjusted to 5.7. To this slurry there is added 150 ppm of $Ca^{++}$ as $CaCl_2$ and 300 ppm of Cl as NaCl. The slurry is digested (with stirring) at these conditions for 5 hours, at which point the slurry has a D.E. of 22, and 58% of the starch remains undissolved.

The slurry is heated at 105°C for 10 minutes, then cooled to 60°C, and 0.14 unit of glucoamylase per gram of starch is added. The mixture is stirred at these conditions for 24 hours whereupon the pH is adjusted to 4.2 and stirring continued for 42 hours, at which point the mixture has a D.E. of 97.4 and contains no undissolved starch.

EXAMPLE 2

The procedure of Example 1 is repeated except that the first period of starch digestion at a pH of 5.7 is 25 hours instead of five hours, and the second period is 5 hours instead of 24 hours. The resulting slurry has a D.E. of 36, and 39% of the starch remains undissolved.

The final product has a D.E. of 97.3 and contains no undissolved starch.

EXAMPLE 3

A starch slurry containing 32% of granular starch, 2.3 units of Thermamyl per gram of starch and 0.04 unit of glucoamylase per gram of starch is heated with stirring at 60°C and a pH of 5.7 for 4 hours, whereupon 20.8% of the starch is solubilized. The slurry then is heated at 100°C for 10 minutes, then at 60°C with an additional 0.14 units of glucoamylase for 6 hours. The pH is adjusted to 4.2 and stirring continued for another 62 hours. The final product contains 1.0% of undissolved starch and the yield of dextrose is 94.2%.

EXAMPLE 4

A starch slurry containing 30% of granular starch, 2.0 units of Thermamyl per gram of starch and 0.25 unit of glucoamylase per gram of starch is heated with stirring at 60°C and a pH of 5.5. for 24 hours, whereupon 69.9% of the starch is solubilized. The slurry then is heated at 100°C for 60 minutes then, with an additional 0.14 units of glucoamylase, at 60°C and at a pH of 4.3 for 47 hours. The final product contains 1.0% of undissolved starch and the yield of dextrose is 94.6%.

EXAMPLE 5

A starch slurry containing 32% of granular starch and 2.0 units of Thermamyl per gram of starch is heated with stirring for 16 hours at 65°C and a pH of 5.5, then at 102°C for 30 minutes. The resulting mixture is cooled to 55°C and 2.5 units (per gram of starch) of Biozyme M (beta-amylase) is added. These conditions of pH (5.5) and temperature (55°C) were maintained with continued stirring for 48 hours. The resulting hydrolysate is characterized by the following analyses:

| | |
|---|---|
| D.E. | 45.3 |
| dextrose | 3% |
| maltose | 54% |
| matotriose | 29% |
| maltotetrose | 1% |
| higher polysaccharides | 13% |

EXAMPLE 6

A starch slurry containing 32% of granular starch, 2.4 units of Thermamyl per gram of starch and 1.25 units of Biozyme M per gram of starch is heated with stirring, then at 102°C for 30 minutes. The temperature is lowered to 58°C, an additional 2.5 units of Biozyme M is added, and this temperature maintained with continued stirring for 20 hours more. The resulting hydrolysate is characterized by the following analyses:

| | |
|---|---|
| D.E. | 43 |
| dextrose | 4.5% |
| maltose | 47% |
| maltotriose | 27% |
| maltotetrose | 2% |
| higher polysaccharides | 19.5% |

What is claimed is:

1. A process for directly converting granular starch to a soluble starch hydrolysate, comprising:
   a. agitating a mixture of granular starch, water, and an alpha-amylase enzyme preparation, enzymatically solubilizing the starch in said agitated mixture at a temperature in the range from the normal initial gelatinization temperature of the starch to the actual gelatinization temperature of the starch, maintaining said conditions of enzymatic solubilization for a period of time to enzymatically convert at least about 10% of the starch to a soluble starch hydrolysate, whereby any residual, non-soluble starch from said conditions has substantially retained its granular, ungelatinized form;
   b. heating said mixture to a temperature above the gelatinization temperature of the starch so as to gelatinize substantially all of the remaining non-soluble, ungelatinized granular starch in the mixture; and
   c. adjusting the temperature to within the range from about 50°C. to about 65°C. and the pH to within the range from about 4 to about 6, and adding at least one saccharifying enzyme preparation to enzymatically saccharify and convert the heat-treated soluble starch hydrolysate, whereby the action of the saccharification enzyme preparation is conducted such as to substantially increase the dextrose equivalent value (D.E.) of the soluble starch hydrolysate.

2. The process of claims 1, wherein the starch is corn starch.

3. The process of claim 1, wherein the concentration of the starch is from about 5% to about 40%, by weight.

4. The process of claim 1, wherein the starch is corn starch and the enzymatic solubilization of step (a) is conducted at a temperature in the range from about 55°C. to about 75°C.

5. The process of claim 1, wherein the amount of alpha-amylase used in step (a) is sufficient to provide from about 0.1 to about 25 alpha-amylase units of activity per gram of starch (dry basis).

6. The process of claim 1, wherein the alpha-amylase used in step (a) is derived from a Bacillus organism.

7. The process of claim 1, wherein the alpha-amylase used in step (a) is derived from a *Bacillus licheniformis* organism.

8. The process of claim 1, wherein a saccharification enzyme preparation is added to the mixture of step (a).

9. The process of claim 1, wherein the agitated mixture in step (a) contains from about 0.01 to about 1.0% of an anionic surfactant, by weight of the mixture.

10. The process of claim 1, wherein the temperature of the heating in step (b) is in the range of from about 85°C. to about 150°C.

11. The process of claim 1, wherein one of the saccharification enzymes of step (c) is a glucoamylase enzyme preparation and the pH is in the range from about 4 to about 4.5, said preparation being present in an amount to provide from about 0.05 to about 5 glucoamylase units of activity per gram of starch (dry basis).

12. The process of claim 1, wherein one of the saccharification enzymes of step (c) is a beta-amylase enzyme preparation, said preparation being present in a amount to provide from about 0.1 to about 5 of beta-amylase units of activity per gram of starch (dry basis).

13. The process of claim 1, wherein a pullulanase enzyme preparation is added to the mixture of step (a) and/or step (c) in an amount to provide from about 0.1 to about 0.5 pullulanase units of activity per gram of starch (dry basis) in the mixture.

14. The process of claim 1, wherein the mixture of step (a) additionally includes starch solubilization products to inhibit the gelatinization of the starch.

15. A process for directly converting granular starch to a soluble starch hydrolysate, comprising:
   a. agitating a mixture of granular starch, water, and a bacterial alpha-amylase enzyme preparation, said starch having a concentration from about 5% to about 40%, by weight of the mixture, enzymatically solubilizing the starch in said agitated mixture, at a temperature in the range from the normal initial gelatinization temperature of the starch to the actual gelatinization temperature of the starch, maintaining said conditions of enzymatic solubilization for a period of time to enzymatically convert at least about 10% of the starch to a soluble starch hydrolysate, whereby any residual, nonsoluble starch from said conditions has substantially retained its granular, ungelatinized form;
   b. heating said mixture to a temperature in the range from about 85°C. to about 150°C. to gelatinize substantially all of the remaining non-soluble, residual granular starch in the mixture; and
   c. adjusting the temperature to within the range from about 50°C. to about 65°C. and the pH from about 4 to about 6, and adding at least one saccharifying enzyme preparation selected from the group consisting of glucoamylase and/or beta-amylase to enzymatically saccharify and convert the heat-treated soluble starch hydrolysate whereby the action of the saccharification enzyme preparation(s) is conducted such as to substantially increase the dextrose equivalent value (D.E.) of the soluble starch hydrolysate.

16. The process of claim 15, wherein the starch is corn starch and the temperature of agitated mixture in step (a) is in the range from 55°C. to about 75°C.

17. The process of claim 15, wherein the amount of the alpha-amylase used in step (a) is sufficient to provide from about 0.1 to about 25 alpha-amylase units of activity per gram of starch (dry basis).

18. The process of claim 15, wherein the alpha-amylase used in step (a) is derived from a *Bacillus licheniformis* organism.

19. The process of claim 15, wherein the alpha-amylase used in step (a) is derived from a strain of the *Bacillus licheniformis* organism selected from the group consisting of NCIB 8061, NCIB 8059, ATCC 6598, ATCC 6634, ATCC 8480, ATCC 9545A and ATCC 11945.

20. The process of claim 15, wherein the temperature of the heating step (b) is in the range of from about 100°C. to about 115°C.

21. The process of claim 15, wherein a glucoamylase enzyme preparation is used in step (c) in an amount such as to provide from about 0.05 to about 5.0 glucoamylase units of activity per gram of starch (dry basis) and the pH of the mixture is in the range of from 4.0 to about 4.5.

22. The process of claim 15, wherein a beta-amylase enzyme preparation is used in step (c) in an amount such as to provide from about 0.1 to about 5.0 beta-amylase units of activity per gram of starch (dry basis).

23. The process of claim 15, wherein a pullulanase enzyme preparation is added to the mixture of step (a) and/or step (c) in an amount such as to provide from about 0.1 to about 0.5 pullulanase units of activity per gram of starch (dry basis).

24. The process of claim 15, wherein the mixture of step (a) contains a saccharifying enzyme preparation in addition to the alpha-amylase enzyme preparation.

25. A process for directly converting granular corn starch to a soluble corn starch hydrolysate containing dextrose comprising:
   a. agitating a mixture of granular corn starch, water, an alpha-amylase enzyme preparation derived from a *Bacillus licheniformis* organism, wherein the starch is present at a concentration in the range from about 5% to about 40% by weight of the mixture, the alpha-amylase enzyme preparation present in the mixture is sufficient to provide from about 1.0 to about 10 alpha-amylase units of activity per gram of corn starch (dry basis), enzymatically solubilizing the corn starch in said agitated mixture at a temperature in the range from the normal initial gelatinization temperature to the actual gelatinization temperature of the coorn starch, at a pH from about 4 to about 7, maintaining said conditions of enzymatic solubilization for a period of time to enzymatically convert at least about 10% of the starch to a soluble starch hydrolysate, whereby any residual, non-soluble starch from said conditions has substantially retained its granular, ungelatinized form;
   b. heating said mixture to a temperature in the range from about 100°C. to about 115°C. to gelatinize substantially all of the remaining non-soluble residual, granular starch in the mixture; and
   c. adjusting the temperature of the mixture within the range from about 50°C. to about 65°C. and the pH from about 4 to about 4.5, and adding a glucoamylase enzyme preparation, in an amount such as to provide from about 0.05 to about 5 glucoamylase units of activity per gram of starch (dry basis) to ensymatically saccharify and convert the soluble starch hydrolysate to a soluble starch hydrolysate containing dextrose.

26. The process of claim 25, wherein a glucoamylase emzyme preparation is added to the mixture of step (a) in an amount to provide from about 0.01 to about 0.3 glucoamylase units of activity per gram of starch (dry basis).

27. The process of claim 25, wherein a pullulanase enzyme is added to the mixture of step (a) and/or step (c) in an amount such as to provide from about 0.1 to about 0.5 pullulanase units of activity per gram of starch (dry basis) in the mixture.

28. The process of claim 25, wherein the mixture of step (a) additionally includes starch solubilization products to inhibit the gelatinization of the starch.

29. The process of claim 25, wherein the mixture of step (a) additionally contains an anionic surfactant in an amount ranging from about 0.01% to about 1.0% by weight of the agitated mixture.

30. The process of claim 25, wherein the solubilization, and saccharification steps are conducted in an ultrafiltration cell wherein the enzyme preparation and non-soluble starch are retained in the cell and the soluble corn starch hydrolysate containing dextrose is passed through a semi-permeable membrane of said ultrafiltration cell.

31. A process for directly converting granular starch to a soluble starch hydrolysate containing maltose and maltotriose, comprising:
   a. agitating a mixture of granular starch, water, an alpha-amylase enzyme preparation derived from a *Bacillus licheniformis* organism, wherein the starch is present at a concentration in the range from about 5% to about 40%, by weight, of the mixture, the alpha-amylase enzyme preparation is present in an amount to provide from about 1.0 to about 10 alpha-amylase units of activity per gram of starch (dry basis), to enzymatically solubilize the starch in said agitated mixture at a temperature in the range from the normal initial gelatinization temperature to the actual gelatinization temperature of the starch, at a pH from about 4 to about 7, maintaining said conditions of enzymatic solubilization for a period of time to enzymatically convert at least about 10% of the starch to a soluble starch hydrolysate, whereby any residual, non-soluble starch from said conditions has substantially retained its granular, ungelatinized form;

b. heating said mixture to a temperature in the range from about 100°C. to about 115°C. to gelatinize substantially all of the remaining non-soluble residual, granular starch in the mixture; and c. adjusting the temperature of the mixture within the range from about 50°C. to about 65°C. and the pH from about 4 to about 6, and adding a beta-amylase enzyme preparation in an amount such as to provide from about 0.1 to about 5 beta-amylase units of activity per gram of starch (dry basis), to enzymatically saccharify and convert the soluble starch hydrolysate to a soluble starch hydrolysate containing maltose and maltotriose.

32. The process of claim 31, wherein a beta-amylase enzyme preparation is added to the mixture of step (a) in an amount to provide from about 0.1 to about 5 beta-amylase units of activity per gram of starch (dry basis).

33. The process of claim 31, wherein a pullulanase enzyme is added to the mixture of step (a) and/or step (c) in an amount to provide from about 0.1 to about 0.5 pullulanase units of activity per gram of starch (dry basis), in the mixture.

* * * * *